United States Patent [19]
Alagheband et al.

[11] Patent Number: 5,982,587
[45] Date of Patent: Nov. 9, 1999

[54] MECHANICAL ACTUATOR LATCH SUBASSEMBLY WITH OVERCENTERING SPRING FOR A DISK DRIVE

[75] Inventors: Amir G. Alagheband, Vancouver, Canada; Aris C. Cleanthous, Towson, Md.; Omar Hafez, Mountian View; Brian Eric Lee, Pacific Grove, both of Calif.; David M. Payne, Meridian, Id.

[73] Assignee: Western Digital Corporation, Irvine, Calif.

[21] Appl. No.: 09/015,680

[22] Filed: Jan. 29, 1998

[51] Int. Cl.⁶ .............................. G11B 5/54; G11B 21/22
[52] U.S. Cl. .............................................................. 360/105
[58] Field of Search ....................................... 360/105, 106

[56] References Cited

U.S. PATENT DOCUMENTS

| | | | |
|---|---|---|---|
| 4,989,108 | 1/1991 | Chang ....................................... | 360/105 |
| 5,216,662 | 6/1993 | Stefansky et al. .................... | 360/105 X |
| 5,369,538 | 11/1994 | Moe et al. ............................... | 360/106 |
| 5,381,290 | 1/1995 | Cheng ..................................... | 360/105 |
| 5,452,161 | 9/1995 | Williams ................................. | 360/105 |
| 5,455,728 | 10/1995 | Edwards et al. ........................ | 360/105 |
| 5,668,683 | 9/1997 | Stone ...................................... | 360/105 |
| 5,768,057 | 6/1998 | Fernandes et al. ..................... | 360/105 |
| 5,805,384 | 9/1998 | Bronshvatch et al. ................. | 360/105 |

*Primary Examiner*—William R. Korzuch
*Attorney, Agent, or Firm*—Leo J. Young; Milad G. Shara

[57] ABSTRACT

A head disk assembly for a hard disk drive having a mechanical actuator latch subassembly. The head disk assembly includes an enclosure, a disk, a pivot bearing cartridge, and a head stack assembly. The enclosure includes a base that preferably includes integral side walls. The disk has a recording surface that has an annular landing zone. The head stack assembly includes a head supported to be moved radially relative to the recording surface and to be brought to rest at a position in the landing zone. Significantly, the head disk assembly also includes a unitary latch base member and a unitary pivot latch member. The unitary latch base member has a mounting portion for mounting the latch base member to the base, an arm extending parallel to the major interior-facing surface, an inner crash stop post including an engaging end, and a pivot post. The arm also includes a spring holding post. The unitary pivot latch member has a bore surrounding the pivot post to allow pivot motion of the pivot latch member. The unitary pivot latch member also includes a receiving surface, a latch surface and a spring holding mount. In one embodiment, the head disk assembly also includes a spring for biasing the unitary pivot latch member in a latched or an unlatched position. The head stack assembly also includes a tang which engages the engaging end and the latch surface to define an inner crash stop and latch.

11 Claims, 9 Drawing Sheets

MECHANICAL ACTUATOR LATCH SUBASSEMBLY WITH OVERCENTERING SPRING FOR A DISK DRIVE

BACKGROUND OF THE INVENTION

1. Field of the Invention

This invention relates to hard disk drives. More specifically, this invention relates to an actuator latch in which the latching mechanism is effectuated by mechanical components.

2. Description of the Prior Art and Related Information

A large market exists for hard disk drives for mass-market host computer systems such as servers, desktop computers, and laptop computers. To be competitive in this market, a hard disk drive must be relatively inexpensive, and must accordingly embody a design that is adapted for low cost mass production. In addition, the hard disk drive must provide substantial storage capacity, rapid access to data and reliable performance. Numerous manufacturers compete in this large market and collectively conduct substantial research and development, at great annual cost, to design and develop innovative hard disk drives to meet increasingly demanding customer requirements.

Each of numerous contemporary mass-market hard disk drive models provides relatively large capacity, often in excess of a few gigabytes per drive. Nevertheless, there exits substantial competitive pressure to develop mass-market hard disk drives that have even higher capacities and that provide rapid access to data at lower prices. Another requirement to be competitive in this market is that the hard disk drive must conform to a selected standard exterior size and shape often referred to as a "form factor." Generally, capacity is desirably increased without increasing the form factor or the form factor is reduced without decreasing capacity.

Satisfying these competing constraints of low-cost, small size, high capacity and rapid access requires innovation in each of numerous components and methods of assembly including methods of assembly of various components into certain subassemblies. Typically, the main subassemblies of a hard disk drive are a head disk assembly ("HDA") and a printed circuit board assembly ("PCBA").

The HDA includes: an enclosure including a base and a cover; at least one disk having at least one recording surface; a spindle motor for causing each disk to rotate; and an actuator arrangement. The printed circuit board assembly includes circuitry for processing signals and controlling operations of the drive.

In a contemporary mass-market disk drive, the actuator arrangement is a type often referred to as a rotary voice coil motor (VCM) actuator. The rotary VCM actuator in a head disk assembly typically includes a permanent magnet arrangement forming part of the voice coil motor, a head stack assembly (HSA), and a pivot bearing cartridge that includes a shaft attached to the base to define an axis of rotation for the rotary actuator. The HSA includes a separate head gimbal assembly (HGA) for each recording surface. The HGA includes transducing structure for writing to and reading from a recording surface of a disk. The transducing structure can be a single inductive transducer such as a thin film head, or a structure including an magnetoresistive (MR) element for reading and an inductive element for writing. The transducing structure is suitably contained in a structure referred to interchangeably as a slider or a head. The HSA further includes a coil-carrying wing or cantilevered portion, the coil of which forms another part of the voice coil motor.

The HSA further includes a swing-type structure, and a flex circuit assembly. The swing-type structure has a ring-shaped portion (e.g., a bore extends through it) for surrounding the pivot bearing cartridge, and further includes a plurality of arms cantilevered from the ring-shaped portion.

Each HGA includes a load beam and a slider. Each load beam has a supported end and a free end, with the supported end being supported by one of the arms. Each head is supported by one of the load beams at its free end and is positioned adjacent a disk recording surface when in use.

For each head and recording surface, the relative position of the head and the recording surface involves a vertical distance (such as a flying height or contact) and a radial distance (where the head is relative to the center of the recording surface).

As for vertical distance, while the disks are spinning at normal speed of operation, each head flies adjacent to a recording surface of a disk on a cushion of flowing air. When power is removed and the disks discontinue rotating, the heads "land" on the adjacent surfaces.

As for radial positioning, the HSA forms part of a servo system for controlling the radial position of the heads. The operations of the servo system include track seek operations and track following operations. During a track seek operation, the voice coil motor generates relatively high torque to cause the HSA to rotate about the pivot bearing axis and thereby move the heads radially relative to the disk recording surfaces. During track following operations, the voice coil motor generates relatively low torque in an amount and direction to maintain the heads at substantially the same radial position relative to tracks on the recording surfaces throughout the track following operation.

While the power is off, it is desirable to "park" each head in a position such as on an annular region of the recording surface referred to as a "landing zone." The landing zone is typically located within another annular zone (e.g., the zone used for recording and reading signals which may be further subdivided into zone bands). To park the heads, the HSA is held to prevent it from rotating even if the drive is dropped, struck or otherwise mishandled. To hold the HSA (and thus the heads) in place while the drive is not in use, the HDA typically includes an arrangement that performs a latching function. A related function is a crash stop function. That is, it is desirable to provide an arrangement for limiting the angular motion of the HSA to a range having an inner limit and an outer limit, and for effectively securing or "latching" the HSA while parked.

Figure 1A:
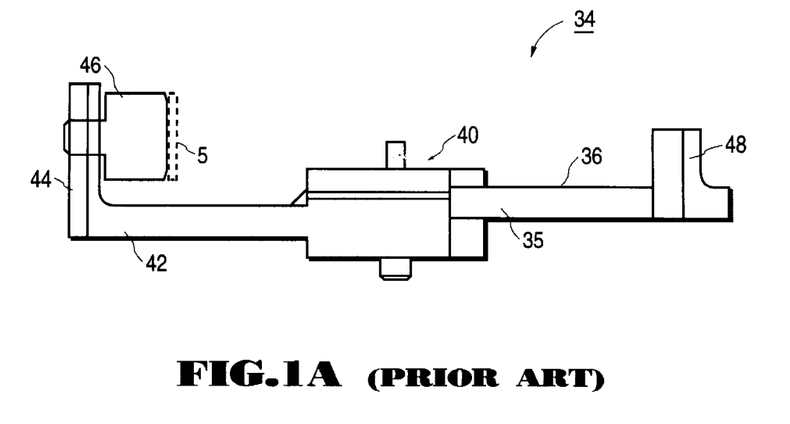
FIG. 1A is a side view of a Prior Art magnetic actuator latch subassembly showing a magnet in contact with a tang of a head stack assembly.
Figure 1B:
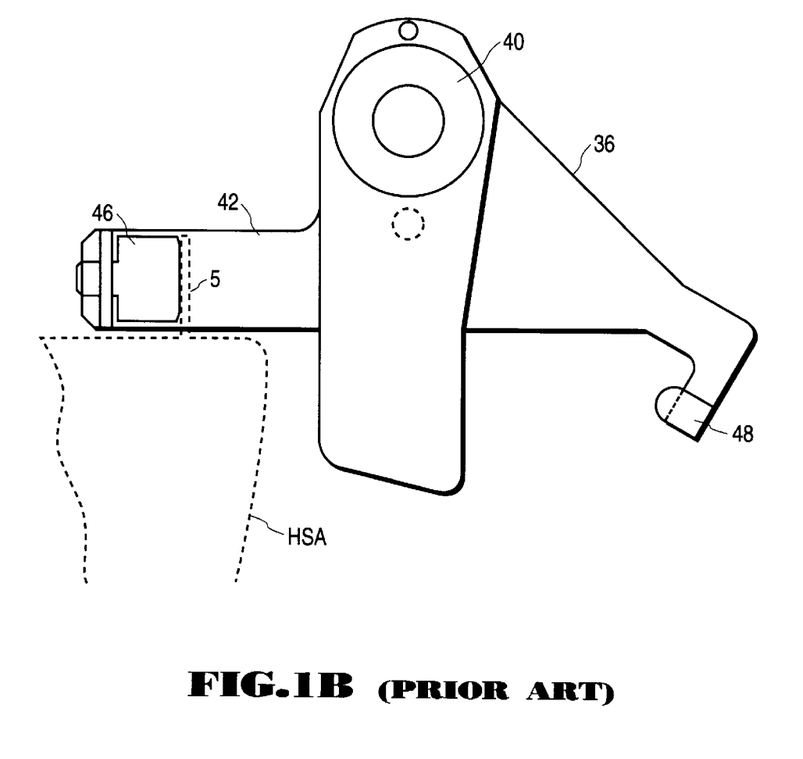
FIG. 1B is a top view of the magnetic actuator latch subassembly of FIG. 1A showing the magnet in contact with the tang of the head stack assembly.

One such arrangement is illustrated in Prior Art FIG. 1A and FIG. 1B. The illustrated prior art arrangement includes a magnetic actuator latch subassembly 34 and a tang 5. Magnetic actuator latch subassembly 34 includes a dual-post unitary crash stop member 35 having a mounting portion 40 for mounting to a base of a disk drive, a pair of cantilevered, oppositely-projecting arms 36 and 42, and a pair of posts 44 and 48 each supported at a far end of a respective one of the arms 36 and 42. The arrangement also includes a generally cylindrical magnet 46 supported by post 44 in an orientation such that its axis is parallel to the cantilevered arms 36 and 42. Tang 5 is cantilevered to project from a portion of an HSA in a direction such that, in the HDA, the tang 5 is movable between the pair of posts 44 and 48 of the dual-post unitary crash stop member 35.

The tang 5 is generally paddle shaped with first and second oppositely facing surfaces. One of these oppositely facing surfaces abuts post 48 of the dual-post unitary crash stop member 35 to perform the outer crash stop function.

The other oppositely-facing surface abuts an end of the cylindrical magnet 46 to perform the inner crash stop and latching functions.

While such an arrangement is useful for its intended purpose, it has certain performance drawbacks. For instance, attractive force of magnet 46 decreases sharply as the separation distance between the magnet 46 and the tang 5 increases when the tang moves out of a latched position. As a result, the cylindrical magnet 46 may accidentally delatch and release the tang 5 when the hard disk drive is dropped, struck or otherwise mishandled.

Such accidental delatching may cause undesirable motions of the head relative to the recording surface of the disk. For instance, the head may crash into the disk (head slap) and cause damage to the disk and the head. Furthermore, debris dislodged from such crashes can cause problems in the operation of the disk drive. In addition, substantial costs are associated with the manufacture of magnetic actuator latch subassembly 34 since the cost of magnet 46 is relatively high compared to the other components of magnetic actuator latch subassembly 34.

Thus, a need exists for an HDA with a low cost actuator latch arrangement that provides for securely holding the HSA in a fixed position when the head is parked and minimizes the risk of accidental delatching.

SUMMARY OF THE INVENTION

This invention can be regarded as a head disk assembly for a hard disk drive. The head disk assembly includes an enclosure, a disk, a pivot bearing cartridge including a shaft fixed to the enclosure, and a head stack assembly. The enclosure includes a base that preferably includes integral side walls. The disk has a recording surface and is coupled to the base. The head stack assembly is connected to the pivot bearing cartridge for rotation relative to the shaft. The base has a plurality of interior-facing surfaces including a major interior-facing surface parallel to the recording surface.

Significantly, the head disk assembly also includes a unitary latch base member and a unitary pivot latch member. The unitary latch base member has a mounting portion for mounting the latch base member to the base, an arm extending parallel to the major interior-facing surface and having a spring holding post, an inner crash stop post including an engaging end, and a pivot post. The unitary pivot latch member has a bore surrounding the pivot post to allow pivot motion of the pivot latch member. The unitary pivot latch member also includes a receiving surface, a latch surface and a spring holding mount.

In one embodiment, the head disk assembly also includes a spring that is subject to a relaxed condition and a biased condition. The spring includes a first member connected to the spring holding post, and a second member connected to the spring holding mount. The spring also includes a curved member between the first and second elongated members. The head stack assembly also includes a tang which engages the engaging end and the latch surface to define an inner crash stop and latch when the spring is in the relaxed condition.

DETAILED DESCRIPTION OF THE PREFERRED EMBODIMENTS

Figure 2:
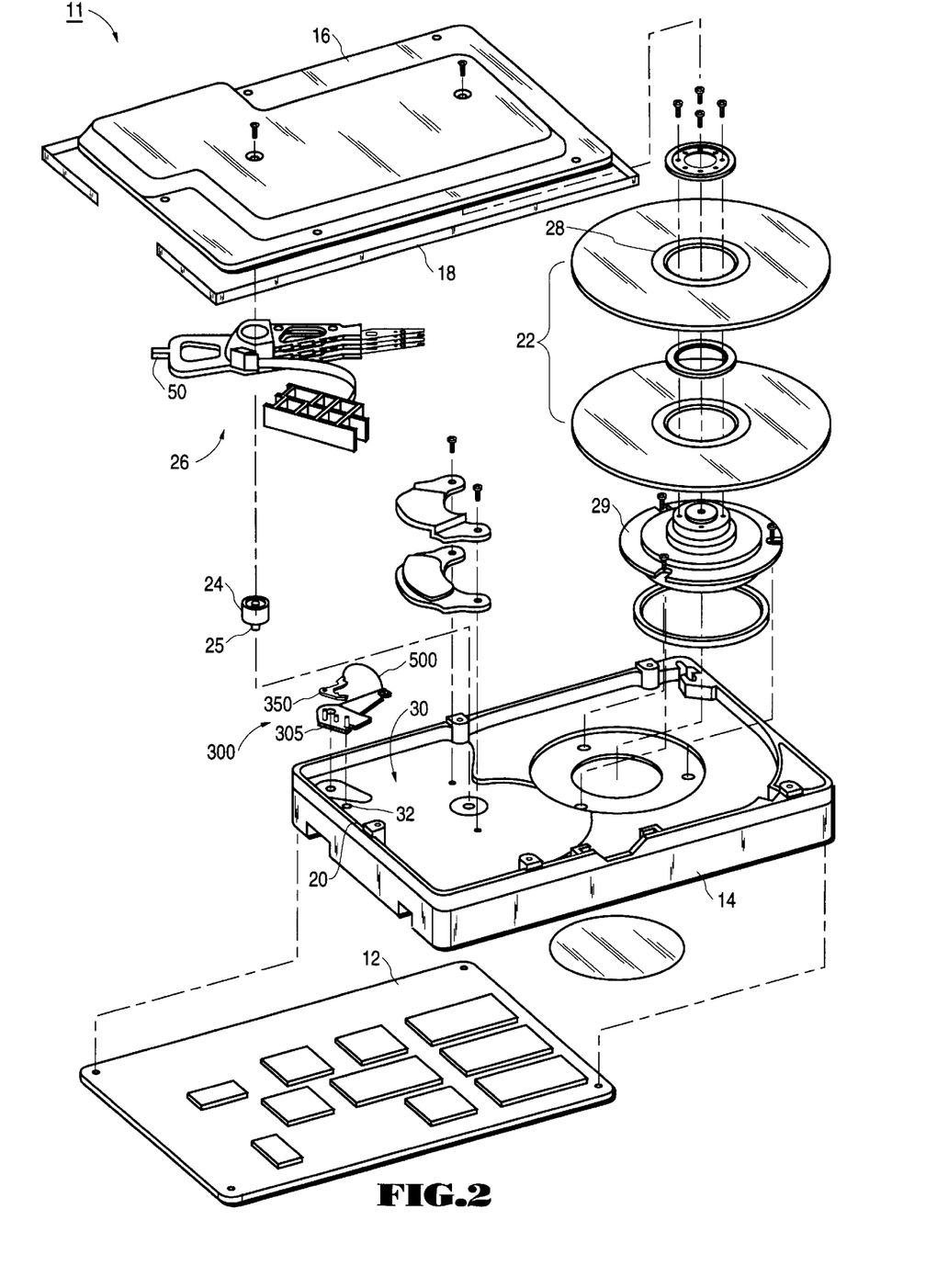
FIG. 2 is an exploded view of a disk drive including a preferred embodiment of this invention.

A preferred embodiment of this invention is incorporated within a disk drive such as one shown in FIG. 2. The illustrated disk drive system includes a head disk assembly (HDA) 11 and a printed circuit board assembly (PCBA) 12.

HDA 11 includes an enclosure including a base 14 and a cover 16. A tape seal 18 is used to seal the enclosure. Preferably, base 14 includes integral side walls including a side wall 20. The enclosure provides a relatively contaminant-free interior for HDA 11.

Within the enclosure, HDA 11 includes a disk 22, a pivot bearing cartridge 24, and a head stack assembly 26. In the particular embodiment depicted in FIG. 2, HDA 11 includes two disks, each having a pair of recording surfaces to provide a total of four recording surfaces that are parallel to each other in a vertical stack. Each recording surface has a landing zone 28. In an alternative embodiment, landing zone 28 may be eliminated such that the heads are parked on a ramp load/unload structure near the outer diameter of the disks. HDA 11 also includes a spindle motor 29 for causing each disk to spin, preferably at a constant angular velocity.

In the illustrated embodiment, HSA 26 of FIG. 2 includes four heads each of which includes a magnetic transducing structure for writing to and reading from a respective one of the recording surfaces. The transducing structure can be a single inductive transducer or a structure including an magnetoresistive (MR) element for reading and an inductive element for writing. Pivot bearing cartridge 24 includes a shaft 25 fixed to the enclosure. HSA 26 is connected to pivot bearing cartridge 24 so that it can rotate relative to the shaft.

Base 14 has a plurality of interior-facing surfaces including a major interior-facing surface 30 parallel to the recording surfaces of disks 22. HSA 26 provides for moving each of its heads radially relative to the adjacent recording surface and to be brought to rest at a position in landing zone 28. Significantly, HDA 11 also includes a mechanical actuator latch subassembly 300 in accordance with this invention.

Suitably, surface 30 includes a location feature 32 for locating subassembly 30. Actuator latch subassembly 300 includes a unitary latch base member 305 for mounting to major interior-facing surface 30, a unitary pivot latch member 350 pivotably coupled to the latch base member 305, and an "overcentering" spring 500 for applying variable-direction torque for biasing the actuator latch subassembly 300 of this invention toward either a latched or an unlatched position. HSA 26 further comprises a metal tang 50 which can be latched by actuator latch subassembly 300 such that the heads of HSA 26 are held in landing zone 28.

Figure 3A:
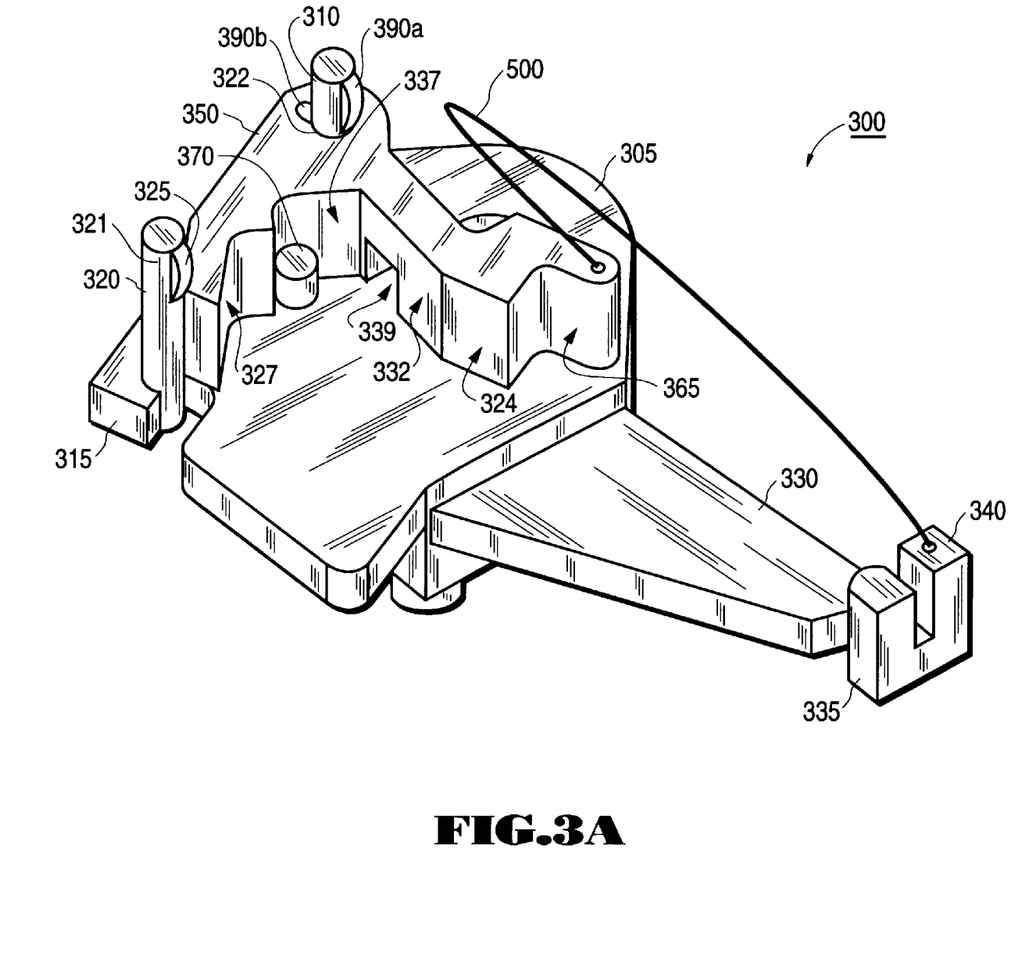
FIG. 3A is an isometric front-side view of a mechanical actuator latch subassembly in accordance with a preferred embodiment of this invention.
Figure 3B:
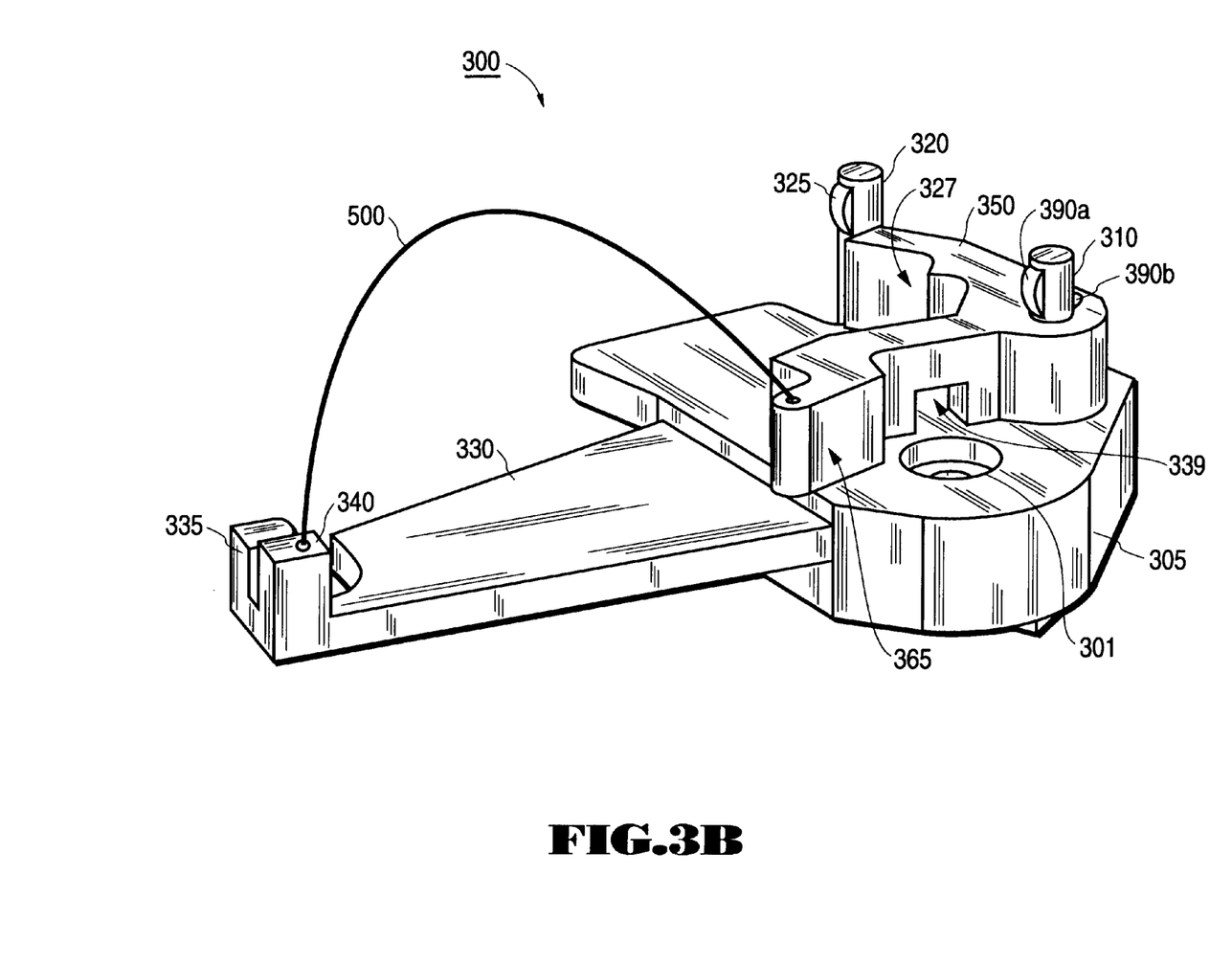
FIG. 3B is an isometric back-side view of the mechanical actuator latch subassembly of FIG. 3A.

With reference to FIGS. 3A and 3B, subassembly 300 is shown in more detail. Unitary latch base member 305 comprises a mounting portion 301 for mounting to interior-facing surface 30 of base 14, a short cantilevered arm 315 having an inner crash stop post 320 which includes an engaging end 321, and a long cantilevered arm 330 extending parallel to major interior-facing surface 30 and having a spring holding post 340. Suitably, a fastener such as a screw may be used to mount the subassembly 300 to base 14 via mounting portion 301. Unitary latch base member 305 further comprises a pivot post 310 and an overcenter post 370. Unitary pivot latch member 350 comprises a cylindrical bore 322 surrounding pivot post 310 to allow pivot motion of the pivot latch member 350. Significantly, unitary pivot latch member 350 includes a receiving surface 327, a latch surface 332, and a spring holding mount 365. Pivot latch member 350 further includes surface 324 which is sloped relative to latch surface 332. Such a sloped feature prevents tang 50 (see FIG. 4A) from contacting pivot latch member 350 once tang 50 disengages contact with latch surface 332 when tang 50 moves from the latched to unlatched positions. As shown, receiving surface 327 is curved inward in shape. In this invention, unitary pivot latch member 350 further comprises a recess 337 for engaging overcenter post 370, and a channel 339 for accommodating overcenter post 370. In addition, spring 500 is coupled between spring holding mount 365 and spring holding post 340.

Latch base member 305 also includes an outer crash stop post 335 located adjacent to spring holding post 340. In the position of FIG. 3A, overcenter post 370 allows clockwise rotation of pivot latch member 350 with respect to latch base member 305 but not counterclockwise rotation. Preferably, the outer crash stop post 335 is separate from the spring holding post 340 such that outer crash stop post 335 remains sufficiently stiff. If a single post was used to function both as an outer crash stop and as a spring holder, the stiffness of the post may change since the spring exerts forces on the post as the spring moves from position to another. Such a change in stiffness may affect the post's ability to adequately function as an outer crash stop.

In the particular embodiment depicted in FIGS. 3A–3B, engaging end 321 of inner crash stop post 320 includes a protuberance 325 located on a tang-facing side of inner crash stop post 320 for evenly distributing impacts of the tang 50. Outer crash stop post 335 may include a similar protuberance (not shown) for the same purpose. Pivot post 310 may further include a bump 390a for preventing the pivot latch member 350 from decoupling from latch base member 305. In one embodiment, the bump 390a is a "key" for passing through a fitted keyhole 390b. The keyhole 390b allows the pivot post 310 to be inserted into the bore 322 during assembly when pivot latch member 350 is aligned with latch base member 305 in only one position and otherwise acts to prevent pivot latch member 350 from separating axially from latch base member 305 when pivot latch member 350 rotates from latched to unlatched positions.

Preferably, unitary latch base member 305 and unitary pivot latch member 350 are made of polyethernide, a plastic sold under the trademark ULTEM 1000 and can be made using injection molding. Other materials including hard resins which have sufficient stiffness to withstand a high speed impact of the tang and which have a high resistance to fatigue may also be used. Spring 500, on the other hand, is preferably made of stainless steel, but could also be fabricated from a number of well known spring materials.

Figure 4A:
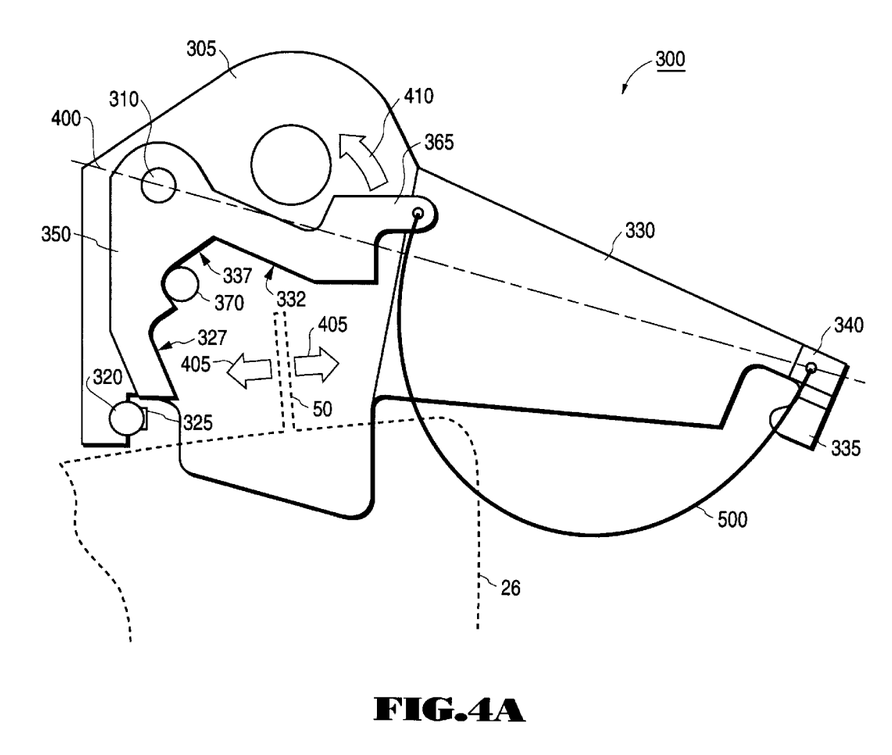
FIG. 4A is a top plan view of the mechanical actuator latch subassembly of FIGS. 3A–3B in an unlatched position, and a tang of a head stack assembly configured to be movable between an inner crash stop and an outer crash stop.

Latching and unlatching operations of actuator latch subassembly 300 are described in the following in conjunction with FIGS. 4A–4B, which illustrate plan views of subassembly 300. Head stack assembly (HSA) 26, only a portion of which is shown, is illustrated in dotted lines; including dotted lines showing first and second sides of tang 50. In the present embodiment, actuator latch subassembly 300 is configured to have two opposite end positions. One of the positions is called an unlatched position as shown in FIG. 4A wherein the spring 500 is subject to a biased condition. In this position, tang 50 is in an unlatched state so as to be movable between inner crash stop post 320 and outer crash stop post 335. An arcuate motion of tang 50 is illustrated by arrows 405 to describe the freedom of movement of tang 50. Spring 500, which is compressed in the unlatched position, provides a counter-clockwise torque $\tau_1$, as indicated by arrow 410 to bias pivot latch member 350. Once actuator latch subassembly 300 has reached the unlatched position, however, pivot latch member 350 is prevented from rotating further in the counter-clockwise direction as over-center post 370 engages recess 337. In other words, overcenter post 370 and recess 337 provide a suitable rotation-limiting means.

Significantly, pivot latch member 350 is operable to receive tang 50 in the unlatched position of FIG. 4A. Receiving surface 327 of pivot latch member 350 is configured to be between inner crash stop post 320 and outer crash stop post 335 such that, before tang 50 reaches inner crash stop post 320, receiving surface 327 is struck by tang 50 to cause pivot latch member 350 to rotate clockwise out of the unlatched position.

The location of spring 500 in spring holding 365 along member 350 is such that given a set of expected component tolerances, the spring 500 will cross over an imaginary center line 400 (see FIG. 4A) such that the unlatched position is reached.

In the present embodiment, overcentering spring 500 is configured to generate a torque about pivot post 310 only when spring 500 does not intersect imaginary center line 400 connecting pivot post 310 and spring holding post 340. When spring 500 intersects center line 400, a small amount of additional force applied by tang 50 to latch surface 332 "kicks" pivot latch member 350 into the unlatched position. In the unlatched position of FIG. 4A, spring holding mount 365 is close to imaginary center line 400. As soon as tang 50 strikes receiving surface 327, the pivot latch member 350 rotates clockwise such that actuator latch subassembly 300 moves to the opposite end position.

Figure 4B:
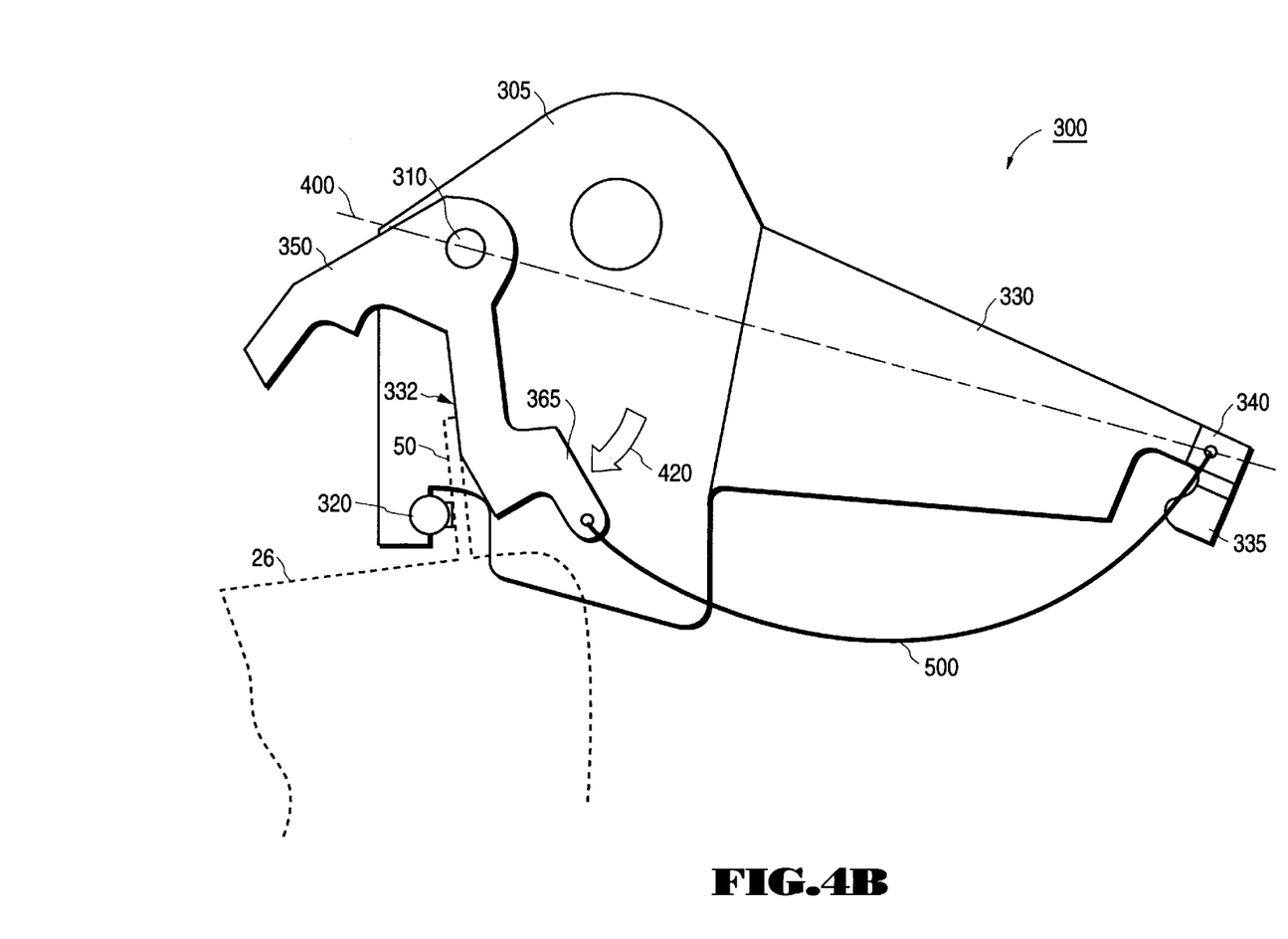
FIG. 4B is a top plan view of the mechanical actuator latch subassembly of FIGS. 3A–3B in a latched position, and the tang engaging the inner crash stop and a latch surface of a pivot latch member.
Figure 5A:
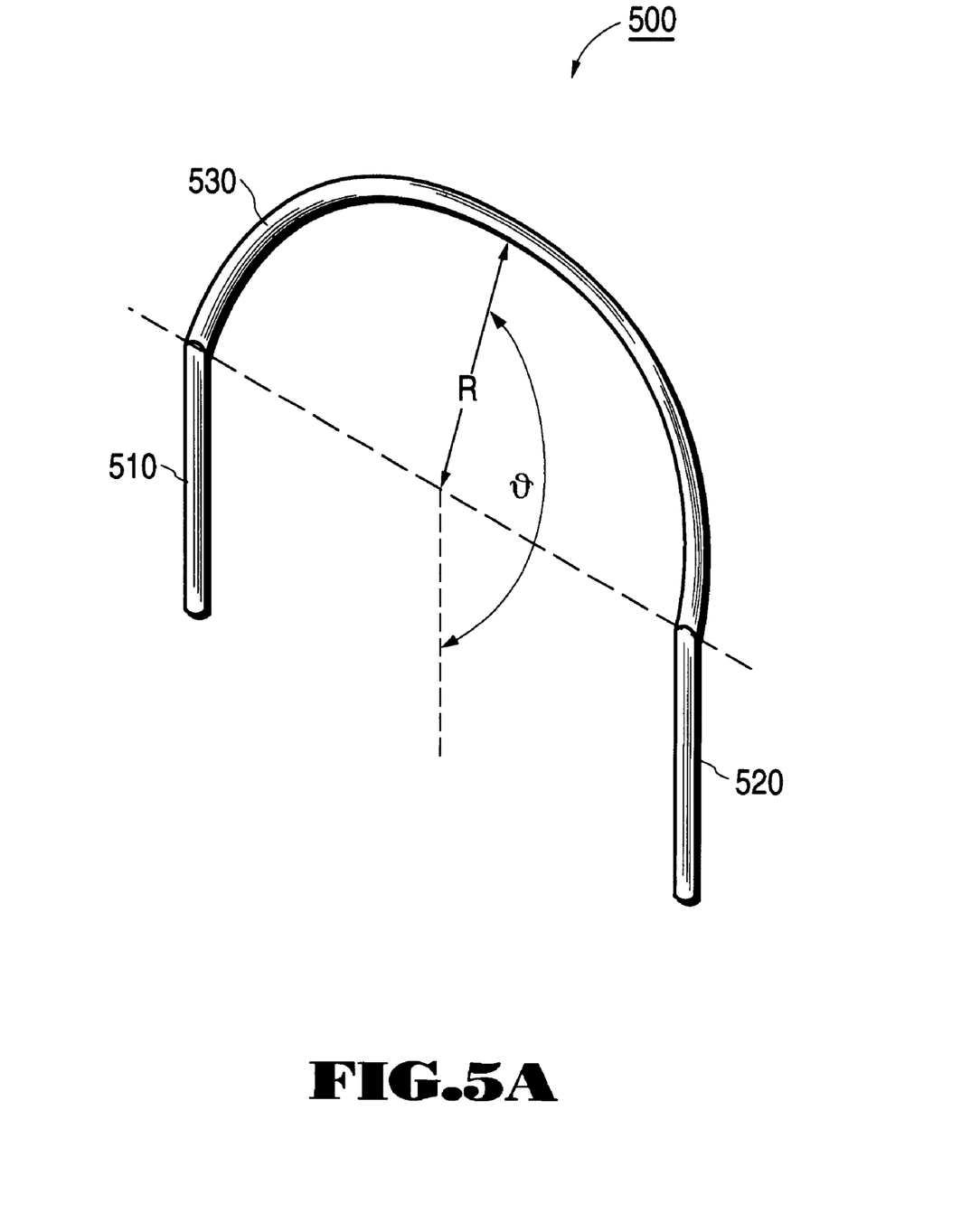
FIG. 5A is an isometric side view of the overcentering spring of FIGS. 3A–3B and FIGS. 4A–4B.
Figure 5B:
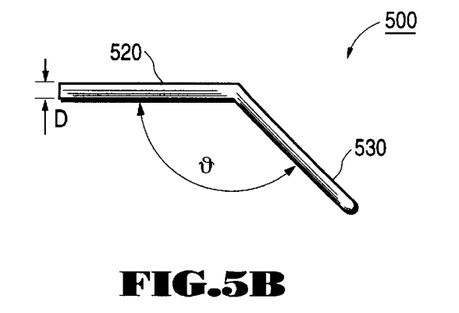
FIG. 5B is a side view of the spring of FIG. 5A.
Figure 5C:
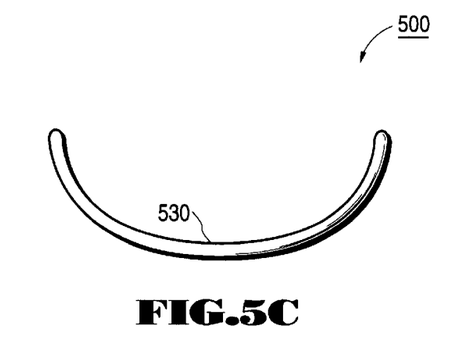
FIG. 5C is a top view of the spring of FIG. 5A.
Figure 5D:
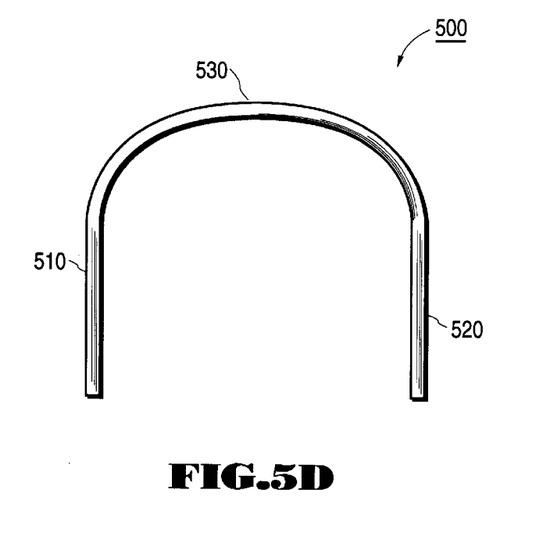
FIG. 5D is front view of the spring of FIG. 5A.

The other position is called a latched position when the spring 500 is subject to a relaxed condition as shown in FIG. 4B. In the latched position, one side of tang 50 abuts inner crash stop post 320 and latching surface 332 of pivot latch member 350 abuts the other side of tang 50. In the present embodiment, spring 500 provides a clockwise torque $\tau_2$ as indicated by arrow 420 which resists pivot latch member 350 from rotating in the counter-clockwise direction so as to retain tang 50 in its latched state. Thus, in order to delatch tang 50, it is necessary to push against latch surface 332 to rotate pivot latch member 350 counterclockwise out of the latched position. If pivot latch member 350 is not rotated a sufficient distance to overcome the resistance of spring 500, tang 50 remains in its latched state and pivot latch member 350 will be pushed back into the latched position. If pivot latch member 350 is rotated sufficiently such that spring 500 crosses the imaginary center line 400, the torque generated by spring 500 will switch direction, and the pivot latch member 350 will be kicked into the unlatched position as shown in FIG. 4A.

As mentioned, in the present embodiment, the unlatched position of FIG. 4A is configured to require less displacement to enter the latched position than the latched position of FIG. 4B requires to enter the unlatched position. In this way, when receiving surface 327 is struck by tang 50, actuator latch subassembly 300 immediately switches to the latched position to capture tang 50. Consequently, annular landing zone 28 on disk 22 can be made to be very small, effectively maximizing the area for storing data on the recording surface of the disk. On the other hand, significantly more work has to be done to switch pivot latch member 350 from the latched position to the unlatched position compared to the prior art magnetic latch subassembly. As a result, even if HDA 11 is dropped, mishandled or otherwise subjected to shock, tang 50 is not easily delatched from its parked state.

With reference to FIGS. 5A–5D, spring 500 comprises a preloaded member 530 that suitably has a radius of curvature R, and two elongated members 510 and 520. When spring 500 is installed in actuator latch subassembly 300, elongated members 510 and 520 are coupled to spring holding post 340 and spring holding mount 365, respectively. In the particular embodiment depicted in FIGS. 5A–5D, spring 500 is made of stainless steel, and may have a suitable diameter D of 0.009 inch. Furthermore, curved member 500 arcuates at an obtuse angle theta (θ) with respect to the elongated members 510 and 520. Preferably, when HDA 11 is assembled, curved member 530 is bent at an angle (e.g., 45° angle) towards HSA 26 such that the enclosure of HAD 11 does not contact the spring.

Figure 6:
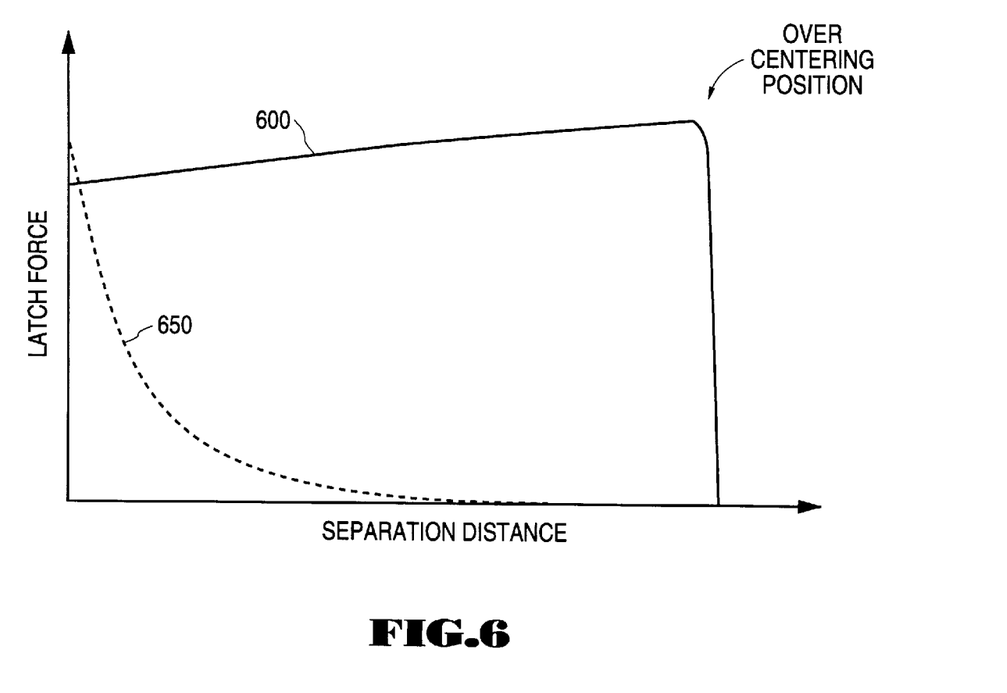
FIG. 6 is a graph comparing latch force of the mechanical actuator latch subassembly of FIGS. 3A–3B of this invention to latch force of the magnetic actuator latch subassembly of FIGS. 1A–1B as functions of separation distance.

With reference to FIG. 6, there will now be described data collected from experiments conducted with a hard disk drive in accordance with the preferred embodiment as depicted in FIG. 2. Curve 600 corresponds to the mechanical actuator latch subassembly 300 of this invention. Specifically, curve 600 is a plot of latch force as a function of separation distance between tang 50 and inner crash stop 320. As shown, latch force of spring 500 remains substantially constant (but increasing slightly) as separation distance increases such that spring 500 exerts a substantially constant (but slightly increasing) latch force against the tang to prevent the tang from switching into the unlatched position. Hence, a more reliable park state is provided over the prior art. Once an overcentering position is reached, however, latch force drops dramatically to release tang 50 such that the tang becomes unlatched.

For comparison purposes, FIG. 6 also includes curve 650 depicting in dotted lines the latch force of a magnetic actuator latch subassembly of prior art FIGS. 1A–1B. Unlike curve 600, curve 650 drops off dramatically as separation distance between magnet 46 and tang 5 increases. As suggested by FIG. 6, the prior art magnetic actuator latch subassembly is more susceptible to shocks, and is subject to a higher risk of accidental delatching. The area under each curve represents the work required to unlatch the tang 50. As seen, the area under curve 600 is much greater than the area under 650.

By providing a substantially constant latch force over a large separation distance, the mechanical actuator latch subassembly of this invention provides for a more reliable mechanism for holding an HSA 26 in a "park" position. This invention minimizes the risk of accidentally delatching the tang and, consequently, the risk of damage to the disks and heads is also minimized. Lastly, this invention provides a cost advantage over the prior art magnetic latch subassembly since expensive permanent magnets are not required in this invention.

We claim:

1. A head disk assembly for a hard disk drive, the head disk assembly comprising:

an inner crash stop including an engaging end;

a pivot latch member pivotably mounted so as to be rotatable relative to a latch pivot axis;

the pivot latch member comprising a receiving surface, a latch surface, and a spring holding mounting feature positioned to swing in an arc centered on the latch pivot axis;

a head stack assembly including a tang having first and second sides, the tang having a latched state and an unlatched state;

a spring comprising a stationary member supported to provide a spring pivot axis extending parallel to the latch pivot axis, a revolving member connected to the spring holding mounting feature, and a pre-loaded member extending between the stationary and revolving members such that the spring applies to the pivot latch member a variable-direction torque that switches direction each time the spring holding mounting feature swings across a boundary line extending between the latch pivot axis and the spring pivot axis;

the latch surface applying latch force against the second side of the tang to bias the first side of the tang toward the engaging end while the tang is in the latched state; and rotation-limiting means for opposing the torque that the spring applies to the pivot latch member while the tang is in the unlatched state.

2. The head disk assembly of claim 1, wherein the inner crash stop comprises a crash stop post.

3. The head disk assembly of claim 1, wherein the pivot latch member is a unitary structure.

4. The head disk assembly of claim 1, wherein the rotation-limiting means comprises an overcenter post.

5. The head disk assembly of claim 1, and including a unitary latch base member including a post for defining the inner crash stop.

6. The head disk assembly of claim 5, wherein the unitary latch base member includes a pivot post and the pivot latch member includes a bore surrounding the pivot post.

7. The head disk assembly of claim 5, wherein the unitary latch base member includes an arm including a spring holding post for supporting the stationary member of the spring.

8. The head disk assembly of claim 1, wherein the latch force remains substantially constant while the second side of the tang pushes the latch surface through a range of motion leading to the spring holding mounting feature crossing the imaginary line.

9. The head disk assembly of claim 1, wherein the head stack assembly is rotatable about a shaft, and wherein each of the latch pivot axis and the spring pivot axis is parallel to the shaft.

10. A head disk assembly for a hard disk drive, the head disk assembly comprising:

an enclosure having a base;

a disk having a recording surface and coupled to the base;

a pivot bearing cartridge including a shaft fixed to the enclosure;

a head stack assembly connected to the pivot bearing cartridge for rotation relative to the shaft, the head stack assembly further including a tang having an unlatched state and a latched state;

the base having a plurality of interior-facing surfaces including a major interior-facing surface parallel to the recording surface;

a unitary latch base member having a mounting portion for mounting the latch base member to the base, an arm extending parallel to the major interior-facing surface, an inner crash stop post including an engaging end, and a pivot post, wherein the arm includes a spring holding post;

a unitary pivot latch member including a bore, the bore surrounding the pivot post to allow pivot motion of the pivot latch member, the pivot latch member comprising a receiving surface, a latch surface and a spring holding mounting feature;

the tang having a first side for selectively engaging, in a sequence in which the latched state is entered, the receiving surface and then the engaging end;

the tang having a second side for selectively engaging the latch surface;

a spring comprising a first member connected to the spring holding post, a second member connected to the spring holding mounting feature and a curved member between the first and second members;

the spring applying to the unitary pivot latch member a variable-direction torque that switches direction each time the spring holding mounting feature swings across a boundary line extending between the pivot post and the spring holding post; and wherein the latch surface applies a latch force against the second side of the tang to bias the first side of the tang toward the engaging end while the tang is in the latched state.

11. The head disk assembly of claim 10, wherein the latch force remains substantially constant while the second side of the tang pushes the latch surface through a range of motion leading to the spring holding mounting feature crossing the imaginary line.

* * * * *